(12) United States Patent
Shaffer (10) Patent No.: US 8,891,800 B1
(45) Date of Patent: Nov. 18, 2014

(54) EARBUD CHARGING CASE FOR MOBILE DEVICE

(71) Applicant: Jonathan Everett Shaffer, Huntingdon Valley, PA (US)

(72) Inventor: Jonathan Everett Shaffer, Huntingdon Valley, PA (US)

( * ) Notice: Subject to any disclaimer, the term of this patent is extended or adjusted under 35 U.S.C. 154(b) by 0 days.

(21) Appl. No.: 14/306,736

(22) Filed: Jun. 17, 2014

Related U.S. Application Data (60) Provisional application No. 61/942,698, filed on Feb. 21, 2014.

(51) Int. Cl.
| | |
|---|---|
| *H04M 1/00* | (2006.01) |
| *H04M 9/00* | (2006.01) |
| *H04R 25/00* | (2006.01) |
| *H04R 1/02* | (2006.01) |
| *H04R 1/06* | (2006.01) |
| *H04R 1/10* | (2006.01) |

(52) U.S. Cl.
CPC .. *H04R 1/02* (2013.01); *H04R 1/06* (2013.01); *H04R 1/10* (2013.01); *H04R 1/1025* (2013.01)
USPC ......... 381/384; 379/437; 379/451; 455/575.1

(58) Field of Classification Search
CPC ............ H04R 1/02; H04R 1/06; H04R 1/025; H04R 1/10; H04M 1/04
USPC .......... 381/370, 182, 384, 395; 379/430, 437, 379/451; 455/575.1, 575.2; D14/205, 206, D14/240, 251
See application file for complete search history.

(56) References Cited

U.S. PATENT DOCUMENTS

| | | | |
|---|---|---|---|
| 7,889,498 B2 | 2/2011 | Diebel et al. | |
| 8,485,404 B2 | 7/2013 | Monaco et al. | |
| 2006/0177082 A1* | 8/2006 | Solomito et al. | 381/322 |
| 2008/0090622 A1* | 4/2008 | Kim et al. | 455/573 |
| 2008/0090626 A1* | 4/2008 | Griffin et al. | 455/575.1 |
| 2009/0296968 A1* | 12/2009 | Wu et al. | 381/323 |
| 2011/0077061 A1* | 3/2011 | Danze et al. | 455/575.1 |
| 2013/0083456 A1 | 4/2013 | Koenig et al. | |
| 2013/0129138 A1* | 5/2013 | Washington, Jr. | 381/384 |
| 2013/0148839 A1* | 6/2013 | Stevinson | 381/384 |
| 2013/0238829 A1 | 9/2013 | Laycock et al. | |
| 2013/0265702 A1 | 10/2013 | Merenda | |

FOREIGN PATENT DOCUMENTS

WO 2013166326 A1 11/2013

* cited by examiner

*Primary Examiner* — Tuan D Nguyen
(74) *Attorney, Agent, or Firm* — Fox Rothschild LLP (57) ABSTRACT

A case for a mobile device includes a rear panel, a plurality of walls extending around the rear panel, a base portion having a jack configured to receive a power cord input, a first aperture configured to receive a first earbud, a first electrical contact of the first aperture configured to engage a first corresponding charging contact of the first earbud, a second aperture configured to receive a second earbud, a second electrical contact of the second aperture configured to engage a second corresponding charging contact of the second earbud, a first electrical connection configured to engage the jack with a power input port of the mobile device, and a second electrical connection configured to engage the jack with the first electrical contact and the second electrical contact.

21 Claims, 7 Drawing Sheets

EARBUD CHARGING CASE FOR MOBILE DEVICE

RELATED APPLICATIONS AND CLAIM OF PRIORITY

This patent document claims priority to U.S. Provisional Patent Application No. 61/942,698, filed Feb. 21, 2014, the disclosure of which is incorporated herein by reference in its entirety.

BACKGROUND

This patent document relates to a mobile device case that serves as an electrical charger and storage dock for rechargeable wireless audio earbuds.

Wireless audio earbuds ("earbuds") are a convenient way to eliminate tangled wires that impede a user's full range of motion. Existing charging devices for wireless earbuds require users to carry external battery packs, storage devices, or dedicated plug-in charging devices. Wireless earbuds are commonly tethered together (although they communicate wirelessly with a mobile device) in order to prevent loss, given inadequate forms of storage for untethered earbuds. Maintaining wireless earbuds can be inconvenient to a user because they require regular electrical charge.

This document describes a device that address some or all of the issues described above.

Background prior art includes U.S. Patent Application No. 2012/0250914, titled "Detachable Wireless Listening Device"; U.S. Pat. No. 8,638,064, titled "Charger Device for a Portable Electronic Device"; and U.S. Pat. No. 8,180,078, titled "Systems and Methods Employing Multiple Individual Wireless Earbuds for a Common Audio Source." The disclosures of each of these documents are incorporated herein by reference in their entirety.

SUMMARY

In an embodiment, a case for a mobile electronic device includes a housing, a set of protectors extending around sides of the housing, and a base portion having a jack configured to receive a power cord input. The case includes two or more earbud receiving apertures. Each earbud receiving aperture is configured to receive an earbud and has one or more electrical contacts configured to engage a rechargeable battery of the earbud when the earbud is positioned within the aperture. A first electrical connector engages the jack with a power input port of a mobile electronic device when placed in the housing. A second electrical connector engages the jack with the one or more electrical contacts. When the power cord input is connected to a power source, the connectors enable a simultaneous charge of the batteries when placed in the apertures and the mobile electronic device when placed in the housing.

Optionally, the housing includes a panel that substantially covers a rear face of the mobile device when the mobile electronic device is placed in the housing. Alternatively, the housing includes a bumper, a front aperture for a display face of the mobile device, and a rear aperture for a rear face of the mobile device.

In some embodiments, the case may include a first magnet positioned to magnetically retain a first earbud in a first one of the earbud retaining apertures, and a second magnet positioned to magnetically retain a second earbud in a second one of the earbud retaining apertures. For example, each earbud receiving aperture may include a magnetic ring positioned to engage and secure the earbud when the earbud is positioned within the aperture. In addition or alternatively, the one or more electrical contacts in each earbud receiving aperture may include a magnet that secures the earbud to the aperture when the earbud is positioned within the aperture. In addition or alternatively, the earbuds may have speakers with magnetic components that engage with magnets or metallic components in the apertures.

The case may also be provided with a charging device, such as a charging cable that is configured to connect to the jack and to plug into a power source. The charging device also may include a data cable that is configured to connect to the jack and to plug into a computing device and convey charge and data to the case from the computing device.

In some embodiments, the case may be provided as part of a kit with two or more earbuds.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The terms "mobile device" and "mobile electronic device" refer to a portable computing device that includes an image capturing device, a processor and tangible, computer-readable memory. The memory may contain programming instructions in the form of a software application that, when executed by the processor, causes the device to perform one or image acquisition and processing operations according to the programming instructions. Examples of suitable devices include portable electronic devices such as smartphones, personal digital assistants, cameras, tablet devices, electronic readers, personal computers, media players, satellite navigation devices and the like.

The term "earbud" refers to a device designed to fit within the ear of a human, and which emits audio signals that the earbud receives from a mobile electronic device. Examples of earbuds include in-ear headphones, hearing aids and the like.

The embodiments described in this document may help eliminate the inconvenience of additional charging devices, independent storage systems, wires, and tethered earbuds by: (1) using a mobile device case to provide electrical charge to wireless earbuds (regular mobile device charging is already required), eliminating the need for an additional charging device; (2) embedding a magnetic dock within a mobile device case to ensure secure storage and sealed transport of the earbuds without the need for an external dock, mitigating the risk of lost earbuds: and (3) allowing for untethered earbud storage, reducing pull and tangling commonly associated with earbuds connected to a mobile device with a wire and tethered wireless earbuds.

FIGS. 1-5 illustrate an embodiment of a mobile device case 11, which embeds a magnetic charging dock for two wireless audio earbuds in the rear of base portion 12.

Figure 1A:
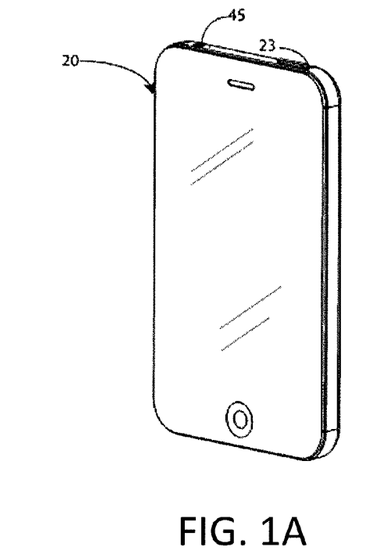
FIG. 1A is an example of a mobile device positioned within a case.
Figure 1B:
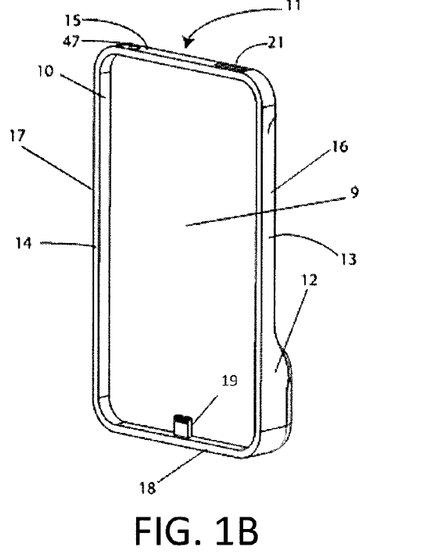
FIG. 1B is an example of a mobile device case with an earbud dock and the mobile device removed from the case.

FIG. 1A illustrates an example of a mobile device 20 positioned within a case 11. As seen in FIG. 1B, the mobile device case 11 generally comprises a base portion 12, four sidewalls 15-18, a bumper 13 that wraps around the sidewalls, and a plug 19 at the base for connecting the power port of a mobile electronic device to the case. The case 11 can be shaped to contain and protect a mobile device 20 (e.g., a smartphone). The mobile device fits snugly within the case, but a user has access to button 23, headphone jack 45, and touch screen of the mobile device either directly or through apertures embedded within the case such as 15 and 21.

Case 11 may be a single solid unit comprising four sidewalls 15-18, bumper portion 13 which runs along the exterior of the sidewalls, base portion 12 and a panel 9 that partially or fully covers a face of the mobile device, typically covering the rear face except for locations of one or more apertures that correspond to elements of the mobile device that provide audio, visual or haptic functions such as a camera, a speaker or microphone, a switch or other electrical components. The housing may include a front aperture that allows a display of the mobile device to remain open for viewing and use. Similarly, any of the sidewalls may include one or more apertures 17 positioned to expose functional elements of the mobile device, such as a microphone, speakers or power switch.

Optionally, the case 11 may be made of a material that is flexible and allows a mobile device to fit snugly within the case 11. The material may also be impact resistant to fracture when case 11 containing a mobile device 20 is dropped from a user's hand, a table, a desk and similar heights onto a variety of surfaces including concrete, asphalt, carpet, and the like. The case 11 may be made of a material that can be produced in a variety of colors. For example, the case 11 can be made of a suitable material such as polycarbonate, polypropylene, polyvinyl chloride, photopolymer, resin, metal, alloy and the like and may be made by a suitable process such as injection molding, casting or 3D printing.

Figure 1C:
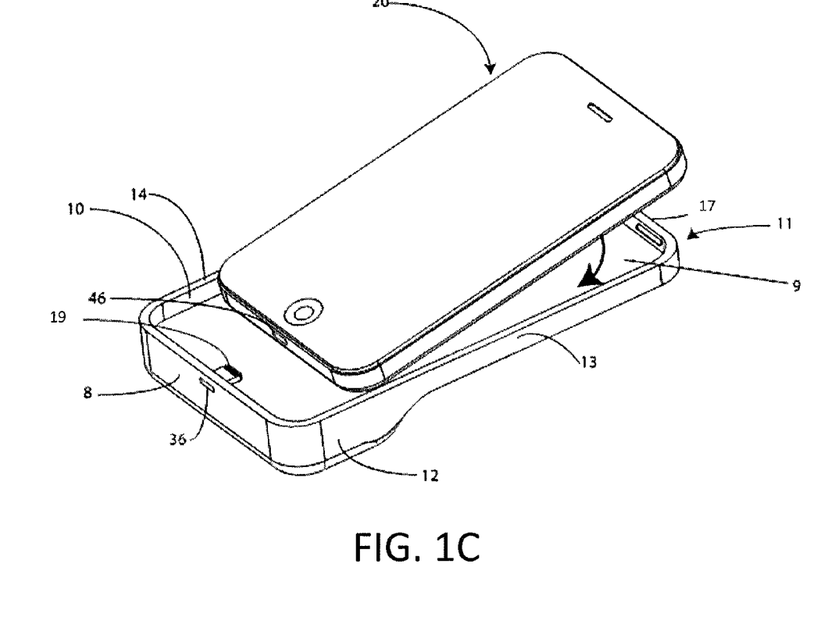
FIG. 1C shows the mobile device from FIG. 1A being inserted into the mobile device case from FIG. 1B.

As demonstrated in FIG. 1C, the user may attach the mobile device 20 to case 11 by aligning the mobile device with the base portion 12 and applying pressure to force plug 19 into the mobile device port jack 46. The mobile device 20 will directly contact the inner wall 10 of the case as well as back panel 9 and plug 19. At the bottom of base portion 12 is an aperture 34 to receive an electrical power cord.

Figure 2A:
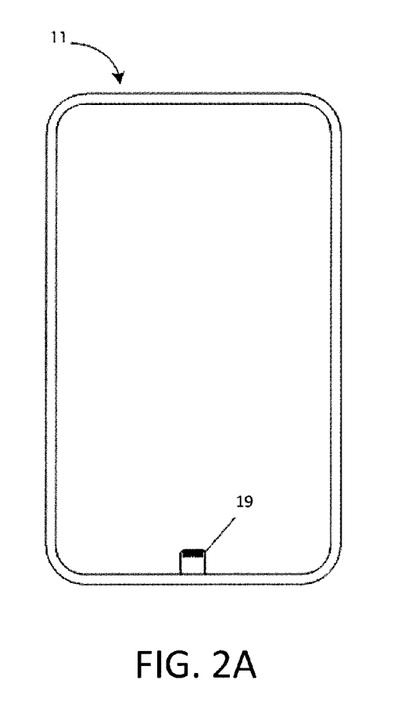
FIG. 2A is a front view of the case shown in FIG. 1B.

FIG. 2A shows a front-facing view of case 11 containing plug 19 as seen through the aperture that corresponds to a face of a mobile device. The plug 19 may be inserted into the port jack of a mobile device and contains electrical contacts that may be configured to connect to a charging device. Electrical connectors that extend from the plug 19 will carry electric charge to both the mobile device and earbud electrical contacts 29 and 31 present on the rear of the case on the base portion 12. A first electrical connector portion from the plug will engage with a power input port or the electronic device, and a second electrical connector portion will engage with the earbud electrical contacts.

Figure 2B:
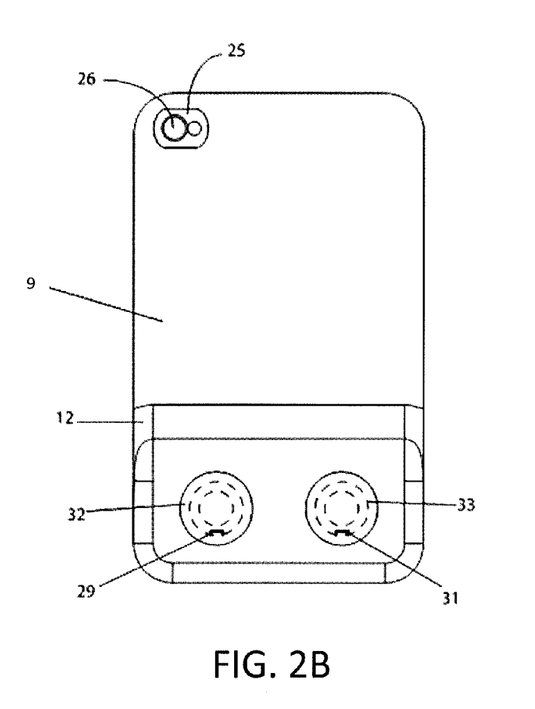
FIG. 2B is a rear view of the case shown in FIG. 1B.

A user may insert a rechargeable earbud into the earbud apertures 32 and 33 to provide electrical charge via the earbud electrical contacts 29 and 31. The rear facing side of rear panel 9 may contain one or more apertures or windows 25, shaped and positioned to allow a view of and access to a feature located on the rear of the mobile device, such as a camera lens 26.

Figures 3A, 3B, 3C, 3D:
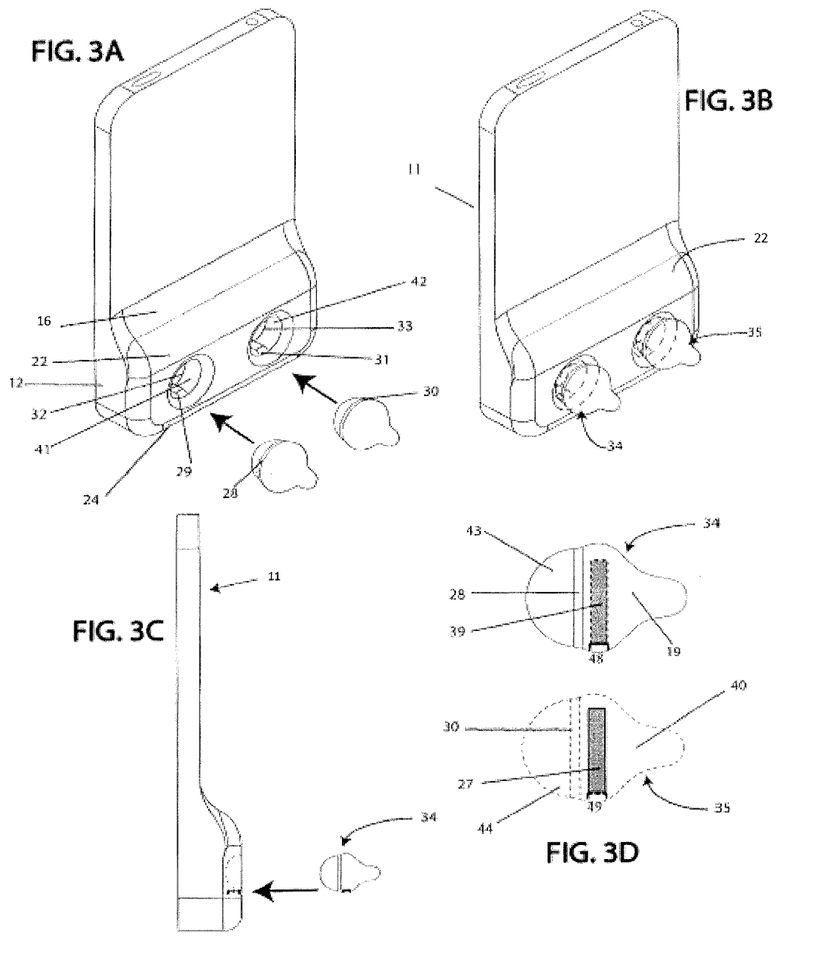
FIG. 3A is a rear view of the case from FIG. 1B with earbuds shown in FIG. 3D entering the case.
FIG. 3B is a rear view of the case from FIG. 1B with earbuds shown in FIG. 3D docked with the case.
FIG. 3C is a side perspective of the case from FIG. 1B with earbuds shown in FIG. 3D entering the case.
FIG. 3D is a simplified diagram of an example of a set of wireless earbuds from FIGS. 3A-3C.

Rechargeable earbuds 34 and 35, optionally holding at least a partial charge, may be inserted into earbud apertures 32 and 33. Base portion 12 contains of a solid rear projection 22 (comprised of the lower portion 24, middle portion 22, and upper portion 16) that provides housing for earbud apertures 32 and 33. The earbud apertures 32 and 33 may be shaped in a fashion to snugly house earbuds 34 and 35 in FIG. 3D.

Optionally, the earbud apertures 32 and 33 may have a semi hemispherical shape to allow a user to easily remove an earbud 34 and 35 from the apertures 32 and 33. In other embodiments, the earbud apertures may match the shape of the earbuds they house, which may be of any shape designed to fit within a user ear canal. The earbud apertures 32 and 33 may also contain electrical connectors/conductors, such as leads or prongs 37 and 38 (pictured in FIG. 4A), allow rechargeable earbud batteries 39 and 27 to receive electrical charge via electrical earbud contacts 48 and 49 (pictured in FIG. 3D). Electrical charge will transmit from the plug to the earbud batteries 39 and 27 via an electrical connector that leads from the plug to electrical contacts 29 and 31 contained within the aperture. In certain embodiments, the aperture magnetic contact strips 41 and 42 may also serve as electrical contacts, delivering charge directly to the earbud magnetic contact strips from the plug without the need for additional prongs or leaders. The earbuds 34 and 35 possess magnetic rings 28 and 30 which allow the earbuds to connect with aperture magnetic contact strips 41 and 42 embedded within earbud apertures 32 and 33 to hold the earbuds within the earbud apertures 32 and 33.

Earbuds contain speakers, and speakers contain magnets. Therefore, in certain embodiments, the magnetic rings 28 and 30 can be omitted and the earbuds can be held within the earbud apertures 32 and 33 by the magnetic attraction between the aperture magnetic contact strips 41 and 42 and the magnet of a speaker within each earbud, respectively. In certain embodiments, the earbuds can connect to the apertures via mechanical fit such as snap-fit or screw-in, in such a manner so that when securely stored, the electrical earbud contacts 48 and 49 connect with aperture electrical contacts 29 and 31.

FIG. 3B shows earbud 34 entering case 11.

FIG. 3C shows a side angle of earbuds 34 and 35 docked with case 11.

FIG. 3D shows earbuds 34 and 35 that contain internal rechargeable batteries 39 and 27 and electrical contacts 48 and 49. The earbuds are outfitted with magnetic rings 41 and 42 that allows a connection with magnetized earbud aperture rings 28 and 30 to ensure the earbuds remain securely retained within apertures 32 and 33. Wireless earbuds typically include internal components, such as acoustic and transmitter/receiver (e.g. Bluetooth®, or near field communication capabilities) that communicates wirelessly with a mobile device such as 20. The earbud tips 43 and 44 that contact the users ear canal may be made from a soft material such as silicone, rubber, resin, photopolymer and the like produced by injection molding or anatomically customized for a user ear canal via 3D printing. The earbud grips 40 and 19 do not contact the user's ear but provide a means for users to grasp and remove them from and ear and may be made of any plastic such as polycarbonate, polypropylene, polyvinyl chloride, photopolymer, resin, metal, alloy and the like and available in a variety of hues. In some embodiments, case 11 can be outfitted to store and charge in-ear hearing aids via apertures 32 and 33.

Electrical components contained within case 11 may comprise such components as wires, printed circuit boards, capacitors, resistors, and the like. The electrical components may transfer the charge from the charging device, to the earbud aperture electrical contacts 29 and 31 and to a mobile device 20 connected to the plug 19. The electrical components may also allow the earbud batteries 39 and 27 to be charged when the earbuds 34, 35 are placed in the earbud apertures 32 and 33 in the case 11 when a charging cable 1000 is inserted into the inlet 36 (see FIG. 5A) and connected to a power source such as a computer or a power outlet.

Figure 4:
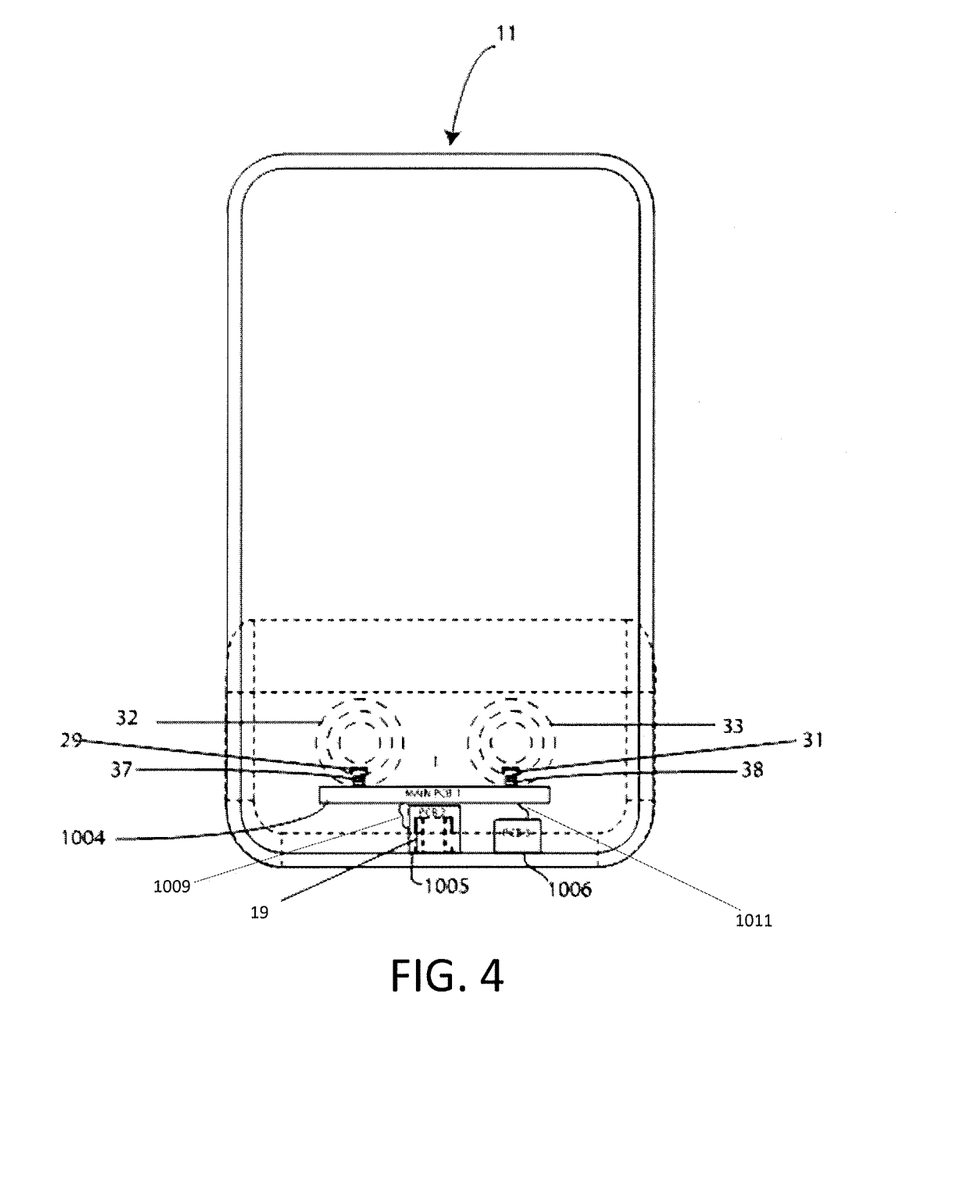
FIG. 4 is a block diagram of various electronic components within a mobile device case.

FIG. 4 shows a view of the case 11 illustrating an example embodiment of its internal electrical components. As shown in the figure, there may be three (or any number of) printed circuit boards (or "PCBs"), the main PCB1 1004, PCB2 1005, and PCB3 1006. PCB1 1004 is the main PCB in the example shown, and it may contain such items as a controller, firmware, an authentication chip, and a battery charging circuit. PCB2 1005 may contain a case connector, such as a 30-pin connector, Lightning connector or other connector. PCB3 1006 may contain the USB connector. Main PCB1 1004 connects to PCB2 1005 through a conductive element portion 1009 such as a cable, trace or bus. Main PCB1 1004 also connects to PCB3 1006 through a conductive element portion 1011. Main PCB1 is electrically connected to plug 1 and may transfer electrical charge to and from the rechargeable ear bud batteries 39 and 27 via earbud electrical contacts 48 and 49, as well as the mobile device 20.

Figure 5A:
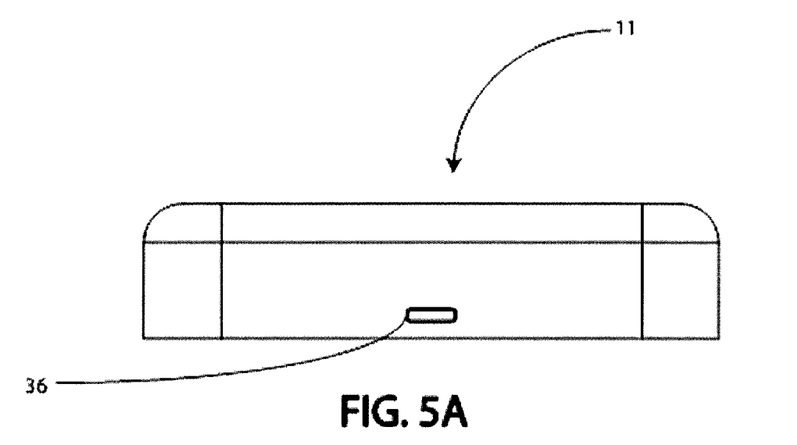
FIG. 5A is a bottom perspective of the case from FIG. 1B.

FIG. 5A illustrates an inlet jack 36 that may serve as a port to the plug 19 of FIG. 4. The inlet jack 36 may include a multi-pin or other connector that corresponds to a connector of charging device (such as cable 1003 in FIG. 5B) that may be used to charge earbud batteries 39 and 27 when it is placed in the earbud apertures 32 and 33. The charging cable 1000 may be configured to plug into a power source, such as a computer, laptop device, car outlet, or a power outlet and the like.

Figure 5B:
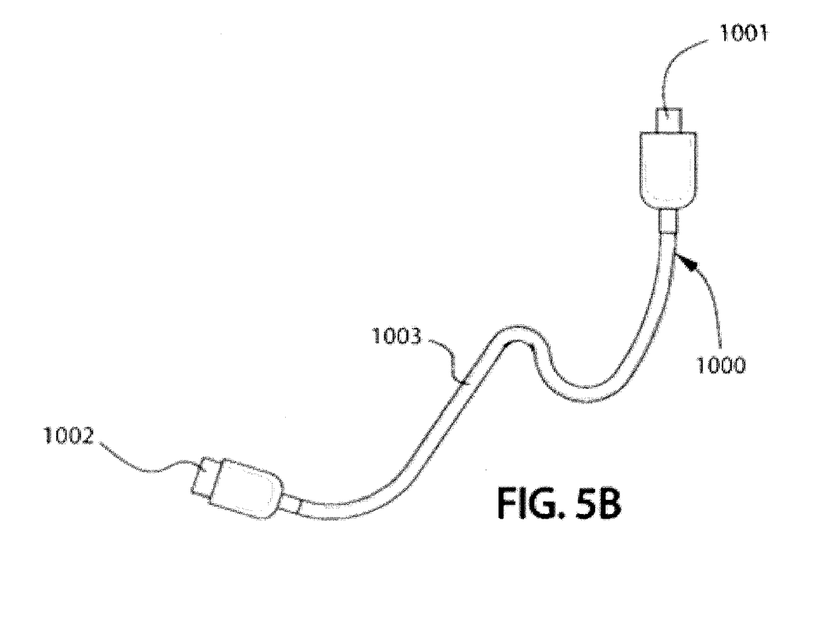
FIG. 5B illustrates a charging or data cable that connects with the case from FIG. 1B.

A data or charging device may comprise any device that may transfer power from a power source to the case 11. In some embodiments, the charging device may be a charging and/or data cable such as charging cable 1000.

The charging and/or data cable 1000 may have a male connector 1001, at one end configured to be inserted into the case 11, another male connector 1002 at the other end shaped to connect to a power source, and a wire 1003 joining the connectors 1001, 1002. The charging and/or data cable 1000 may be capable of transferring power and/or data between a power source and/or computer and a case. Thus, the charging cable may also be a data cable that is configured to connect to the jack and to plug into a computing device and convey charge and data to the case from the computing device.

The charging cable 1000 may be any type of cable having any number of wires that can electronically connect the case 11 to a computer or power source. In one embodiment, the cable is a USB cable where male connector 1001 is a USB mini-A plug and male connector 1002 is a USB type-B plug.

The charging cable 1000 may allow rechargeable earbud batteries 39 and 27 to be charged by a computer and/or power source.

Figure 6:
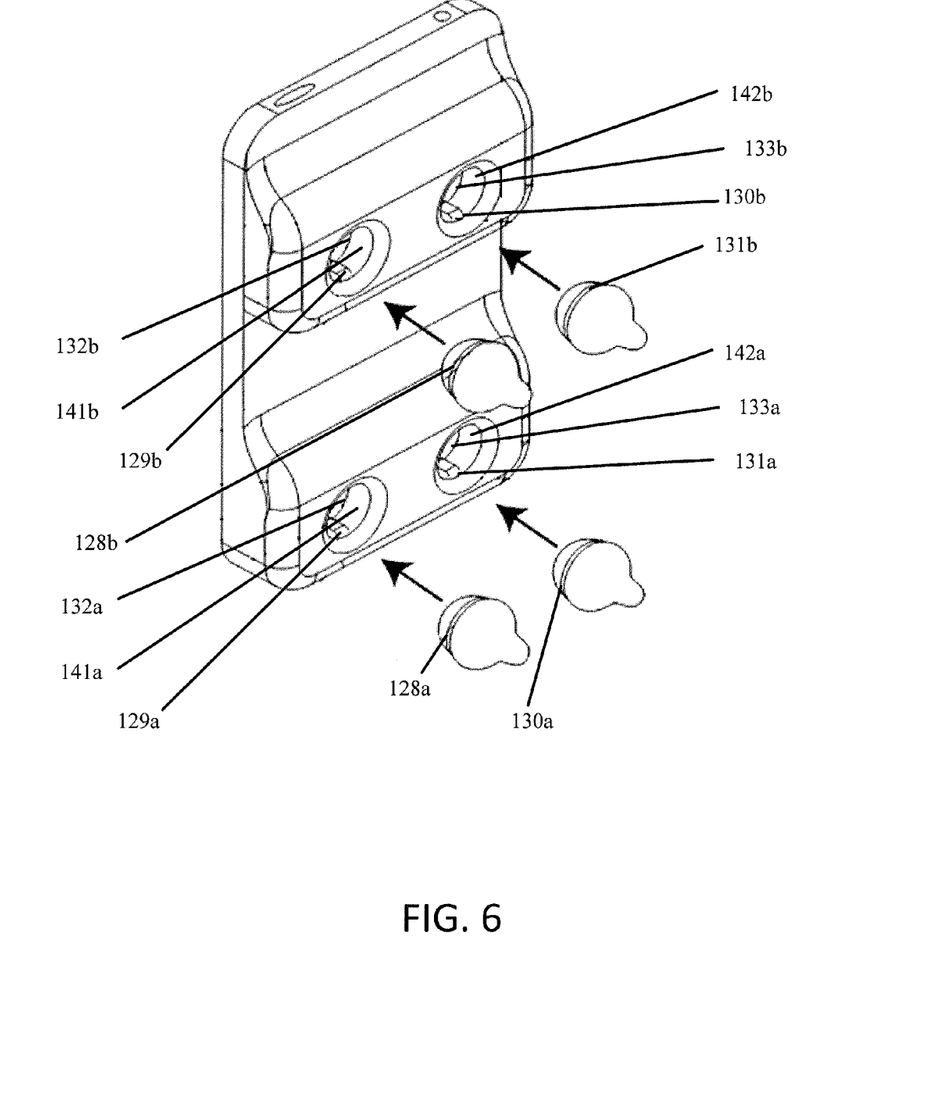
FIG. 6 is a rear view of a mobile device case according to an embodiment of the invention.

FIG. 6 is a rear view of a mobile device case according to an embodiment of the invention. As shown in FIG. 6, a mobile device case can include a plurality of earbud apertures 132*a-b* and 133*a-b*. The earbud apertures can include electrical contacts 129*a-b* and 131*a-b* and magnetic retention rings 141*a-b* and 142*a-b*, respectively. Each earbud can include magnetic rings 128*a-b* and 130*a-b*. The magnetic retention rings 141*a-b* and 142*a-b* can retain the earbuds in the earbud apertures 132*a-b* and 133*a-b* through the magnetic attraction between the retention rings 141*a-b* and 142*a-b* and the earbud magnetic rings 128*a-b* and 130*a-b*, respectively. Although ring-shaped magnets have been shown and described, those of skill in the art will appreciate that other shapes and configurations of magnets (e.g. disk, bar) can generate sufficient magnetic attraction to securely retain the earbuds in their respective apertures.

Figure 7:
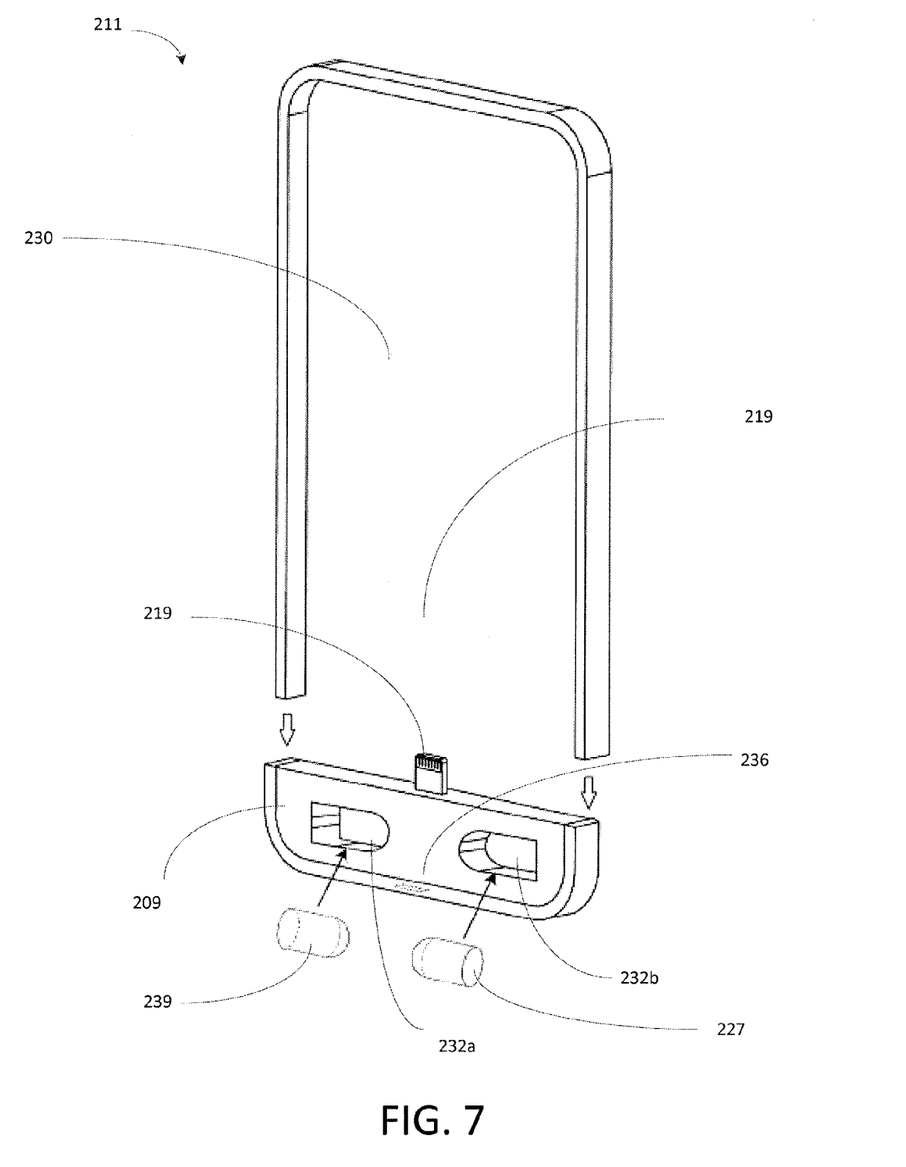
FIG. 7 illustrates an alternate embodiment of a mobile device case/earbud charger.

FIG. 7 illustrates an alternate embodiment of a mobile device case 211 in which the rear panel is a base portion 209 containing apertures for the earbuds. In this embodiment, the base portion 209 may be positioned over only a portion of the mobile device, or over none of the mobile device, so the rear of the mobile device is partially or fully open. This embodiment may have electronics similar to those shown in FIG. 4, although here the electronics may be positioned underneath the mobile device instead of behind it. The base portion 209 contains earbud apertures 232*a-b* that are configured to receive earbud batteries 239, 227 as in previous embodiments. Note that in this embodiment, the "rear" panel may alternatively be positioned so that the earbud apertures 232*a-b* are positioned to correspond to either the front or the rear of the mobile device (or on the top or bottom of the mobile device). One of skill in the art will recognize that the embodiment of FIG. 7 may contain apertures for any number of earbuds. In this embodiment, or even in embodiments where a rear panel exists, the base portion 209 may serve as a bumper that is positioned adjacent the lower sidewall of the case and removably detachable from the case via one or more connectors. In an embodiment, the base portion 209 itself may contain an inlet for receiving power 236 and the plug 219 that extends through the case to be received by a charging port of a mobile electronic device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A case for protecting a mobile electronic device, the case comprising:
   a housing;
   protectors extending around a plurality of sides of the housing;
   a base portion having a jack configured to receive a power cord input;
   a plurality of earbud receiving apertures, wherein each earbud receiving aperture is configured to receive an earbud and comprises one or more electrical contacts configured to engage a rechargeable battery of the earbud when the earbud is positioned within the aperture;
   a first electrical connector configured to engage the jack with a power input port of a mobile electronic device when placed in the housing;

a second electrical connector configured to engage the jack with the one or more electrical contacts; and a conductive element that, when the power cord input is connected to a power source, enables a simultaneous charge of the batteries when placed in the apertures and the mobile electronic device when placed in the housing.

2. The case of claim 1, wherein the housing comprises a panel that substantially covers a rear face of the mobile device when the mobile electronic device is placed in the housing.

3. The case of claim 1, wherein the housing comprises a bumper, a front aperture for a display face of the mobile device, and a rear aperture for a rear face of the mobile device.

4. The case of claim 1, wherein each earbud receiving aperture comprises a magnetic ring positioned to engage and secure the earbud when the earbud is positioned within the aperture.

5. The case of claim 1, wherein the one or more electrical contacts in each aperture receiving aperture comprise a magnet that secures the earbud to the aperture when the earbud is positioned within the aperture.

6. The case of claim 1, further comprising a charging device.

7. The case of claim 6, wherein the charging device comprises a charging cable, wherein the charging cable is configured to connect to the jack and to plug into a power source.

8. The case of claim 1, wherein the charging device comprises a data cable, wherein the data cable is configured to connect to the jack and to plug into a computing device and convey charge and data to the case from the computing device.

9. The case of claim 1 further comprising:
a first magnet positioned to magnetically retain a first earbud in a first one of the earbud retaining apertures; and
a second magnet positioned to magnetically retain a second earbud in a second one of the earbud retaining apertures.

10. A case for protecting a mobile electronic device, the case comprising:
a panel;
a plurality of sidewalls walls extending around the panel;
a base portion having a jack configured to receive a power cord input;
a first aperture configured to receive a first earbud, the first aperture comprising a first electrical contact configured to engage a first corresponding charging contact of the first earbud;
a second aperture configured to receive a second earbud, the second aperture comprising a second electrical contact configured to engage a second corresponding charging contact of the second earbud;
a first electrical connection configured to engage the jack with a power input port of a mobile electronic device; and
a second electrical connection configured to engage the jack with the first electrical contact and the second electrical contact.

11. The case of claim 10, further comprising:
a first magnet positioned to magnetically retain the first earbud in the first aperture; and
a second magnet positioned to magnetically retain the second earbud in the second aperture.

12. The case of claim 10, further comprising:
a third aperture configured to receive a third earbud, the third aperture comprising:
a third electrical contact configured to engage a third corresponding charging contact of the third earbud, and
a third magnet positioned to magnetically retain the third earbud; and
a fourth aperture configured to receive a fourth earbud, the fourth aperture comprising:
a fourth electrical contact configured to engage a fourth corresponding charging contact of the fourth earbud, and
a fourth magnet positioned to magnetically retain the fourth earbud.

13. The case of claim 11, wherein the first earbud includes a first earbud magnet that, together with the first magnet of the first aperture, retains the first earbud in the first aperture via magnetic attraction.

14. The case of claim 13, wherein the first earbud magnet is a magnet of a speaker in the first earbud.

15. The case of claim 10, wherein the panel comprises a rear panel that substantially covers a rear face of the mobile electronic device when the mobile electronic device is placed in the housing.

16. The case of claim 10, wherein the sidewalls form a front aperture for a display face of the mobile electronic device, and a rear aperture for a rear face of the mobile electronic device, and the panel comprises a bumper that is positioned at a lower end of the rear aperture.

17. A kit for protecting a mobile electronic device and charging wireless earbuds, the kit comprising:
a first earbud;
a second earbud;
a case for a mobile electronic device, the case comprising:
a plurality of sidewalls;
a base portion having a jack configured to receive a power cord input;
a panel having a first aperture configured to receive the first earbud;
a first electrical contact of the first aperture configured to engage a first corresponding charging contact of the first earbud;
a first magnet positioned to magnetically retain the first earbud in the first aperture;
a second aperture in the panel, wherein the second aperture is configured to receive the second earbud;
a second electrical contact of the second aperture configured to engage the second corresponding charging contact of the second earbud;
a second magnet positioned to magnetically retain the second earbud in the second aperture;
a first electrical connection configured to engage the jack with a power input port of the mobile device when placed in the case; and
a second electrical connection configured to engage the jack with the first electrical contact and the second electrical contact.

18. The kit of claim 17, further comprising:
a first earbud magnet in the first earbud; and
a second earbud magnet in the second earbud;
wherein:
magnetic attraction between the first magnet of the first aperture and the first earbud magnet substantially maintains the first earbud in the first aperture, and
magnetic attraction between the second magnet and the second corresponding magnet substantially maintains the second earbud in the second aperture.

19. The kit of claim 18 wherein the each earbud magnet is a component of a speaker in a corresponding earbud.

20. The kit of claim 17, wherein the panel comprises a rear panel that substantially covers a rear face of the mobile electronic device when the mobile electronic device is placed in the housing.

21. The kit of claim 17, wherein the sidewalls form a front aperture for a display face of the mobile electronic device, and a rear aperture for a rear face of the mobile electronic device, and the panel comprises a bumper that is positioned at a lower end of the rear aperture.

\* \* \* \* \*